May 22, 1934.  W. H. TAYLOR  1,959,394

ENGINE VALVE

Filed Nov. 1, 1930

Inventor
William H. Taylor
By Justin W. Macklin
Attorney

Patented May 22, 1934

1,959,394

UNITED STATES PATENT OFFICE 1,959,394

ENGINE VALVE

William H. Taylor, Mentor on the Lake, Ohio

Application November 1, 1930, Serial No. 492,714

19 Claims. (Cl. 123—188)

This invention relates to valves and more particularly to valves for internal combustion engines.

In the present forms of internal combustion engines there is a tendency for the valves to stick and rock slightly in the valve guides, causing undue wear and inefficient operation. In the exhaust valves, which are subject to the hot products of combustion from the cylinders, this wear is greatly augmented by carbonaceous deposits on the valve stem and about the guide, partly due to the fact that it is difficult to provide lubrication in the valve sleeve and on the stem in sufficient quantity to withstand the intense heat especially at the top of the guides. Consequently the valve stem quickly becomes worn and roughened on its contact surface with the sleeve or valve guide so that deposits even more quickly form and impede its action.

Another difficulty in such valves resides in the fact that the intense heat of the exhaust gases greatly increases the temperature of the valve and guide where exposed thereto and this increase in temperature is usually greater at the upper end of the valve guide and stem than at the lower and intermediate portions, so that the expansion and contraction of the valve and sleeve vary considerably throughout their length. This expansion or swelling of the valve stem in the guide results in a high co-efficient of friction between the valve stem and guide and, in extreme cases, often causes the valve stem to weld slightly to the guide. The sticking of the valve permits the heated gases to come into contact with the head of the valve seat and results in serious burning and damage thereto.

Experience has proven, however, that if the valve stem is properly lubricated throughout its length, the stem and sleeve are protected from the intense heat and carbonaceous deposits are entirely eliminated. Furthermore, the heat and wear caused by friction of the valve and guide, when improperly lubricated, which results in damage to the guide and stem and sticking of the two, may be entirely eliminated by proper lubrication and the valve then will operate smoothly under all conditions of use and throughout the life of the engine. Again, if the valve stem is so formed that it can yield slightly as it heats, that is, if the expansion is free to travel radially, the stem will not swell or wedge tightly in the guides.

The valve with which my invention is particularly concerned is self-lubricating and thoroughly lubricates both the stem and guide for the full length of contact.

Another advantage of my valve is that radial expansion is compensated so that the valve stem always fits smoothly and snugly but not tightly within the guide.

Another object of my invention is a valve which will accomplish all of these objects and yet which is simple in design and economical to manufacture and which necessitates no change in the engine or usual type of valve sleeve or guide for efficient operation. As a result the valve with which my invention is concerned may be placed in any of the present motor vehicle engines and substituted for the present type of valves.

Another object of my invention is a valve which will work freely and consequently greatly reduce the wear on the valve stem and guide so that at all times it is held and guided in proper axial path and permits proper seating of the head.

Other objects and advantages will become apparent from the following specification which refers to the drawing, the essential characteristics of my invention being summarized in the claims.

In the drawing—

Figure 2:
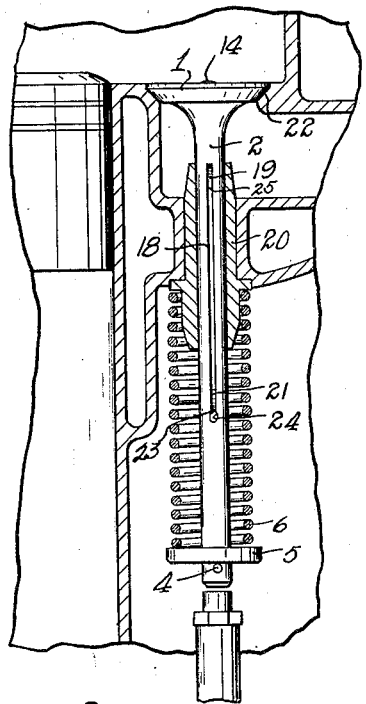
Fig. 2 is an elevation of the valve illustrated in Fig. 1, mounted in the usual valve guide in an internal combustion engine.
Figure 1:
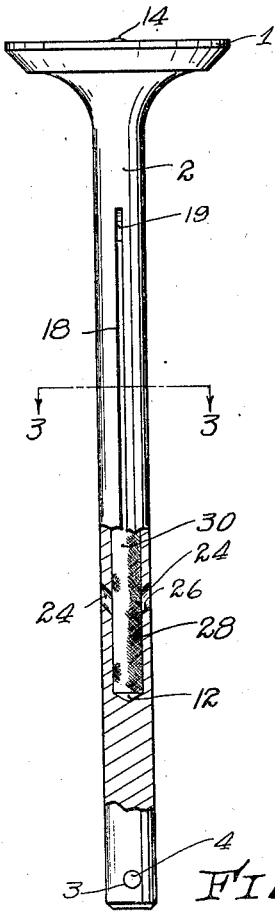
Fig. 1 is an enlarged side elevation of one form of valve embodying the principles of my invention, part thereof being shown in section for clearness of illustration.

As clearly illustrated in Fig. 1, my valve comprises a head 1 of a type for the particular engine with which associated, and a valve stem 2 which may be integral therewith. Both the valve head and stem are preferably cylindrical in form. At the lower end, the stem is drilled to form the usual hole 3 adapted to receive a key 4 for supporting a collar 5 and seating spring 6 as illustrated in Fig. 2, for seating the valve in the usual manner. The valve stem is provided with a central bore 10 which, for convenience in manufacture, may extend through the top of the valve head 1 axially through the stem, terminating short of the base of the stem as indicated at 12. The upper end of the bore 10 may be closed by a suitable plug 14 which is slightly spherical in form and is sprung into an annular groove 16 in the valve head.

The stem is provided with a plurality of longitudinal slots 18, all of which may extend from the outer surface of the stem into a central bore for part or all of their length and thus communicate with each other. As illustrated in Fig. 2, the valve, when installed, is reciprocably mounted in a valve guide 20. The upper ends of the slots 18 terminate slightly below the upper end of the valve guide 20, when the valve is in a closed position. As indicated at 19, the upper end walls of the slots 18 slope on a gradual curve from the bore 10 upwardly and outwardly to the stem surface.

Figure 5:
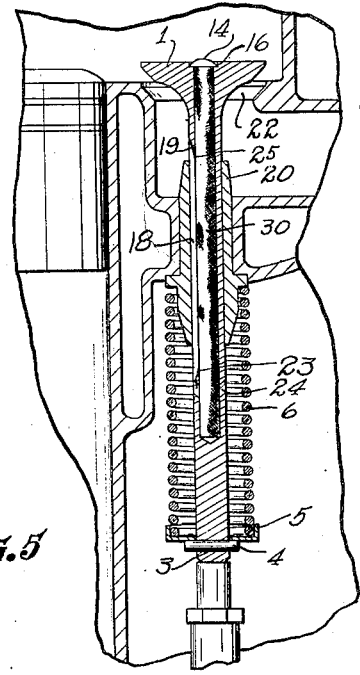
Fig. 5 is a longitudinal sectional view of the valve and part of an engine as in Fig. 2, showing the valve in raised position.

When the valve is raised to the position illustrated in Fig. 5, for opening the port 22, the upper ends of the slots extend above the upper end of the guide 20. I prefer that the upper ends of the slots be positioned so that the lower end of the walls 19 lie opposite or slightly below the upper end of the guide 20 when the valve is open as indicated at 25. Thus only a small rectangular opening is formed between the guide and stem and the bore 10 and wick, later to be described, are not subjected to the direct effect of the exhaust gases. The slots 18 extend downwardly of the stem a sufficient distance below the guide 20 so that when the valve is in closed position, as illustrated in Fig. 2, they are exposed to the splashing oil in the crank case or to oil from any source of supply. Obviously as the valve is raised and lowered part of any oil splashed against the surface will pass into the grooves 18. In order to better pass oil thereinto, a passage 24, which is preferably of larger diameter or width than the slot, is provided at the bottom of each slot. These passages slope downward, as illustrated in Fig. 1, so that any oil passing thereinto will be urged downward along the inclined surface of the passage, indicated at 26, as the valve is raised. The lower end walls 21 of the slots 18 slope on a gradual curve from the central bore outwardly and downwardly, and terminate in the walls of the respective passages 24, as indicated at 23. The surface grooves thus formed tend to catch excess oil which accumulates about the lower end of the guide on the upward motion of the valve and pass it into the passages 24.

In order that a supply of oil will at all times be provided in the bore 10, the bore 10 may extend below the openings 24, and thus provide a cylindrical well as indicated at 28. This well will retain an available amount of oil to insure constant lubrication even though enough is not fed onto the valve stem at some short interval during the operation of the engine.

Thus, as the valve is raised and lowered the oil has free ingress into the central bore and free egress therefrom. For raising the oil through the bore and discharging it at the top of the grooves and consequently into the top of the guide 20, a wick 30 of asbestos or any suitable material capable of withstanding a high degree of temperature is provided within the central bore, preferably completely filling it or slightly packed therein.

Experience has proven that a wick may be packed so tightly that the cap 14 is not needed to seal the top of the valve, though the use of the cap and more loosely packed wick is preferable. The oil rises through the wick by capillary attraction to the heated end of the stem assisted by the higher temperature, and passes out of the upper end of the slots 18. This action thoroughly lubricates both the guide and the stem and provides a film of oil on the stem when it rises out of the guide. The flow of oil out of the grooves is assisted by the sloping end walls 19 of the grooves which permit easy outward flow. Furthermore, in case of expansion due to the heating of the valve and stem, the slots will tend to close partially and relieve the pressure between guide and stem so that the valve will fit snugly but not too tightly against the walls of the guide. As one example, the complementary contact surfaces of the stem and guide may fit against each other with a degree of pressure such that, in commonly used automobile engine valves, an axial force of fourteen pounds or more is required to reciprocate the stem in the guide. This degree of tightness may vary, however, for various size valves, the important feature being that the surfaces of the guide and stem be held in tight enough contact to insure efficient conduction of heat from the stem to the guide through the complementary contact surfaces.

Experience has proven that the maintenance of such contact is a very decided improvement in maintaining the valve at comparatively low working temperatures and greatly reduces the amount of lubricant necessary for dependable and a continuous operation for a long period of time. The wick of course is yieldable enough so as not to affect substantially the radial yielding of the stem.

As a result the stem is in effective contact with the inner walls of the guide at all times and over a large area so that the thermo-conduction from the stem into the guide is much greater than in the case of solid stem having the usual allowed clearance. The heat therefore is rapidly removed from the stem by conduction into the guide and dissipated therefrom.

The valve should be provided with a sufficient number of slots to deposit the lubricant evenly about the guide and stem. Consequently, I prefer to use several slots so that the valve will not have to be carefully positioned or arranged in a predetermined position to operate. I have found that a single slot extending entirely through the valve stem greatly weakens the stem and forms a diametral place of weakness, so that the stem tends to yield across the slot and become loose in the guide. Furthermore, there is a tendency for the two sides of the stem thus formed to spread outwardly and wedge against the guide. In other words, the valve stem is weaker across the slot than it is in a direction of the plane of the slot.

Equally as important is the fact that expansion is not equalized in all directions but is greater parallel to the slot than across it. Four slots lying in intersecting planes normal to each other are very effective.

Experience has proven, however, that three radial slots disposed at angles of 120° from each other will distribute the lubricant very evenly and will not affect appreciably the rigidity and strength of the stem in any direction, as the support of only one-half of the total wall thickness of the stem is lost in any direction. Expansion is also equalized. In other words, in no case can radial pressure be exerted on the valve stem normal to a portion which is unsupported for its full width.

Figure 4:
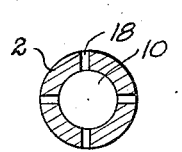
Fig. 4 is a similar cross sectional view of another form of my invention which is satisfactory for the larger type of valves.
Figure 3:
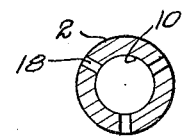
Fig. 3 is a cross sectional view of the valve taken on a plane indicated by the line 3—3 of Fig. 1.

In the valves of larger diameter more slots may be required and since the valve stems are considerably larger and sufficiently rigid, I may use four slots as indicated in Fig. 4, as the danger of springing of the stem transversely of one slot is greatly reduced. However, even in the case of larger valves it may be desirable to provide five evenly spaced slots of less width for the reason above stated.

I have proven that a valve such as described used in an automobile, operates as effectively at the end of 25,000 miles operation of an automobile as it did when new and that occasional low oil, high speeds and excessive engine heat do not affect the smooth operation of the valve or cause it to stick or jam. An examination of the valves so used show practically no wear and a smooth snug fit with the valve guide.

While I have described my invention as applied to internal combustion engines, for which it is particularly adapted, obviously a valve stem such as I have described is effective for operating any valve and will be found particularly useful in case the valve is operating under high temperatures.

While by way of illustration I have shown the usual integral valve head and stem for an automobile engine, obviously such a stem may be used with any other type of valve head and suitable guide and such are included in my invention. The valve head, as used in the claims, is meant to define either a head rigid with or pivotally or otherwise connected to the stem.

I claim:

1. A valve for internal combustion engines comprising a head and a cylindrical stem, said stem having a plurality of longitudinally extending slots lying in intersecting radial planes and dividing said stem into yieldable sections.

2. In an internal combustion engine having a port, a valve for closing said port, said valve comprising a head and stem, said stem having a plurality of slots lying in planes through the axis of the stem and spaced apart 120° from each other, said slots dividing said stem into radially yieldable sections.

3. A valve for internal combustion engines comprising a head and stem, said stem having a central bore and a plurality of elongated slots extending outwardly therefrom to the surface of the valve stem, and forming passages into said bore, said slots and bore cooperating to render the stem radially yieldable.

4. A valve for engines comprising a head and stem, said stem having a central bore and an elongated slot communicating therewith and extending to the outer surface of said stem cooperating with said bore to render the walls of said stem radially yieldable.

5. A valve for engines comprising a valve head and a stem connected thereto, said stem having a central bore and communicating slots extending from said bore to the outer surface, said bore extending axially of the stem past the ends of said slots and forming a well therebelow, a wick within said central bore extending into said well.

6. A valve for engines comprising a head and stem, said stem having a central bore and longitudinal slots communicating therewith and extending to the outer surface of said stem, a wick within said bore.

7. A valve for internal combustion engines comprising a head and stem, said stem having a central bore and a plurality of elongated slots extending outwardly therefrom to the surface of the valve stem and forming passages into said bore, a wick within said central bore, the lower end walls of said slots sloping downwardly and outwardly toward the bottom of the stem.

8. A valve for engines comprising a valve head and a stem connected thereto, said stem having a bore and elongated passages extending from said bore to the outer surface, said bore extending axially past the ends of said passages and forming a well therebelow, a wick within said central bore extending into said well the lower ends of each of said passages terminating in an enlarged passage sloping downwardly and inwardly toward said well.

9. In an engine having a port and a valve for closing said port, a valve guide for reciprocably supporting said valve, said valve comprising a head and stem, said stem having a plurality of longitudinal slots, and an axial passage communicating said slots, the upper end walls of said slots sloping downwardly and inwardly of the stem and so positioned that the lower edges of the upper end walls lie approximately opposite the upper end of the guide when the valve is in open position.

10. A poppet valve comprising a head and stem, a portion of the stem intermediate the ends being slotted with elongated longitudinally extending slots, the slots intersecting each other internally of the stem and lying in radial planes.

11. In an apparatus having a port, a valve for opening and closing said port, said valve comprising a head and stem, said stem having a plurality of elongated longitudinally extending slots, said slots lying in planes angularly disposed to each other and dividing said stem into yieldable sections.

12. A valve comprising a head and stem, said stem having a plurality of longitudinally extending elongated slots, said slots lying in intersecting planes and communicating with each other internally of the valve stem and dividing said stem into yieldable sections.

13. In an internal combustion engine, a poppet valve comprising a head and stem, a valve guide member adapted to embrace the valve stem for reciprocably supporting the valve, and means for maintaining the complementary contacting surfaces of the valve stem and guide in yieldable engagement with each other, for substantially the entire length of the said complementary contacting surfaces of the guide and stem, for conducting heat from the stem into the guide whereby it is dissipated into the engine mass.

14. A poppet valve comprising a head and stem, said stem having a plurality of longitudinal slots extending from the outer surface inwardly of the stem, and angularly disposed relative to each other, said slots communicating with each other internally of the stem at a common intersection and dividing said stem into yieldable sections.

15. A valve construction comprising a head and stem member and a guide member for the stem member, the complementary contact surfaces of one of said members being yieldably movable radially in a plurality of angularly disposed planes toward and away from the common axis of said members, and said complementary contact surfaces of the members being maintained in yieldable engagement with each other during operation of the valve.

16. A valve comprising a head and stem, the stem comprising a plurality of yieldable sections, said sections being yieldable in a plurality of angularly disposed planes.

17. In an engine having a port, a valve for opening and closing said port, said valve comprising a head and stem, guide means for reciprocably supporting the stem, and means including a plurality of elongated slots in said stem extending longitudinally thereof and intersecting each other internally of the stem for maintaining complementary contact wall portions of said stem and guide means in yielding contact with each other.

18. In an engine having a port, a valve adapted to open and close said port, said valve comprising a head and stem, guide means for reciprocably supporting said stem, and means for maintaining contacting wall portions of the guide means and the stem in yielding contact with each other for conducting heat from said stem into said guide means.

19. In an engine having a port, a valve adapted to open and close said port, said valve comprising a head and stem, means having a wall surface in sliding contact with the stem, and means for maintaining the contacting wall portions of said means and stem in radially yielding contact with each other for conducting heat from the stem into said means.

WM. H. TAYLOR.